(12) United States Patent
Ramirez et al.

(10) Patent No.: US 11,680,621 B2
(45) Date of Patent: Jun. 20, 2023

(54) DUAL SPRING VALVE

(71) Applicant: Mueller International, LLC, Atlanta, GA (US)

(72) Inventors: Julian Ramirez, Aurora, IL (US); Aurelian Ioan Furcoiu, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 306 days.

(21) Appl. No.: 17/110,914

(22) Filed: Dec. 3, 2020

(65) Prior Publication Data
US 2022/0178417 A1 Jun. 9, 2022

(51) Int. Cl.
| | |
|---|---|
| F16K 15/06 | (2006.01) |
| F16K 47/00 | (2006.01) |
| F16F 9/32 | (2006.01) |
| F16F 9/34 | (2006.01) |

(52) U.S. Cl.
CPC .............. *F16F 9/3207* (2013.01); *F16F 9/34* (2013.01); *F16K 15/063* (2013.01); *F16K 15/067* (2021.08); *F16K 47/012* (2021.08); *F16F 2238/026* (2013.01); *F16K 2200/401* (2021.08)

(58) Field of Classification Search
CPC ...... F16F 9/3207; F16F 9/34; F16F 2238/026; F16K 47/012; F16K 2200/401; F16K 15/063; F16K 15/067; F16K 15/028; F16K 17/044; F16K 17/30; F16K 17/26; F16K 17/196; Y10T 137/7905; Y10T 137/7922; Y10T 137/7932; Y10T 137/7925

See application file for complete search history.

(56) References Cited

U.S. PATENT DOCUMENTS

| | | | |
|---|---|---|---|
| 1,710,214 A | 1/1928 | Hassold | |
| 1,798,536 A * | 3/1931 | Hofmann | ................ F16K 17/19 137/538 |
| 2,500,156 A * | 3/1950 | Dechant | .................. F16K 15/18 137/614.19 |

(Continued)

FOREIGN PATENT DOCUMENTS

| | | | | |
|---|---|---|---|---|
| EP | 1106880 A2 | * | 6/2001 | ........... F16K 17/196 |
| KR | 102314190 B1 | * | 10/2021 | |

OTHER PUBLICATIONS

Abouelleil, Ashraf; Non-Final Office Action for U.S. Appl. No. 16/166,642, filed Oct. 22, 2018, dated Apr. 17, 2020, 10 pgs.

(Continued)

*Primary Examiner* — Marina A Tietjen
(74) *Attorney, Agent, or Firm* — Taylor English Duma LLP (57) ABSTRACT

Example aspects of a sliding disc assembly for a dual spring valve, and a method of operating a dual spring valve are disclosed. The sliding disc assembly can comprise a shaft defining a first end and a second end; a disc mounted on the shaft between the first end and the second end, the disc defining an upper disc surface, a lower disc surface, and an annular base surface; a first spring mounted on the shaft between the lower disc surface and the first end of the shaft; and a second spring mounted on the shaft between the upper disc surface and the second end of the shaft, wherein the first spring defines a spring force that is different from a spring force of the second spring.

27 Claims, 7 Drawing Sheets

(56) References Cited

U.S. PATENT DOCUMENTS

| | | | | | |
|---|---|---|---|---|---|
| 2,623,725 | A | * | 12/1952 | Sands | F16K 17/30 251/118 |
| 3,085,589 | A | * | 4/1963 | Sands | A62C 4/02 251/363 |
| 3,134,393 | A | * | 5/1964 | Samuel | F16K 17/19 137/513.5 |
| 4,580,596 | A | | 4/1986 | Stehling | |
| 6,237,893 | B1 | | 5/2001 | Rose et al. | |
| 10,844,965 | B2 | | 11/2020 | Abouelleil et al. | |
| 2020/0124182 | A1 | | 4/2020 | Abouelleil et al. | |

OTHER PUBLICATIONS

Abouelleil, Ashraf; Notice of Allowance for U.S. Appl. No. 16/166,642, filed Oct. 22, 2018, dated Mar. 10, 2020, 10 pgs.

* cited by examiner

DUAL SPRING VALVE

TECHNICAL FIELD

This disclosure relates to piping systems. More specifically, this disclosure relates to a dual spring valve.

BACKGROUND

Air/vacuum valves can be installed with fluid transfer pipelines to alleviate air pockets and to prevent vacuums from forming in the pipeline. Air pockets can be formed when air collects in the pipeline and can slow or stop the flow of fluid in the pipeline. Air collected in the pipe can escape through the air/vacuum valve and can be released into the atmosphere to prevent the formation of air pockets. Further, a vacuum can form in a pipeline when the pipeline is drained and/or when the internal pressure of the pipeline drops below atmospheric pressure. Atmospheric air can enter the pipeline through the air/vacuum valve to prevent the formation of a vacuum.

Commonly, air/vacuum valves comprise a body, a channel extending through the body, and a float positioned within the channel. The channel can define an inlet opening and an outlet opening. When the fluid in a pipeline rises, fluid can enter the channel through the inlet opening. The float can be elevated by the rising fluid towards the outlet opening. The float can block the opening when the fluid reaches a critical level, closing the air/vacuum valve. When the air/vacuum valve is closed abruptly, fluid hammer can occur. The surge of pressure resulting from the abrupt cessation of fluid in motion can create a shock wave within the air/vacuum valve and/or pipeline that can cause damage to the air/vacuum valve and/or pipeline.

A valve can be installed with the air/vacuum valve and pipeline to regulate the flow of fluid into the air/vacuum valve, aiding in the prevention of fluid hammer. The valve can be a check valve or a modified check valve, for example. Check valves often comprise a spring-loaded disc biased away from a seat. When fluid rises into the check valve, pressure is applied to the spring loaded disc, forcing it into engagement with the seat, closing the check valve. Openings can be formed in the disc to allow for a slow and measured flow of fluid into the air/vacuum valve. However, check valves often do not close fast enough to prevent fluid hammer in the air/vacuum valve. Additionally, check valves sometimes slam open or closed, which can result in damage to the check valve.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a sliding disc assembly for a dual spring valve, the sliding disc assembly comprising a shaft defining a first end and a second end; a disc mounted on the shaft between the first end and the second end, the disc defining an upper disc surface, a lower disc surface, and an annular base surface; a first spring mounted on the shaft between the lower disc surface and the first end of the shaft; and a second spring mounted on the shaft between the upper disc surface and the second end of the shaft, wherein the first spring defines a spring force that is different from a spring force of the second spring.

Also disclosed is a dual spring valve comprising a valve body, the valve body defining an inlet end, an outlet end, and a cavity extending from the inlet end to the outlet end; a seat body positioned within the cavity and defining a seating surface; and a sliding disc assembly positioned within the cavity, the sliding disc assembly comprising a disc, a first spring, and a second spring, the disc defining a base surface, the sliding disc assembly movable between a first position, wherein the base surface is spaced from the seating surface, and a second position, wherein the base surface seats with seating surface, the second spring biasing the sliding disc assembly towards the first position, and the first spring biasing the sliding disc assembly towards the second position; wherein the dual spring valve is in an open configuration when the sliding disc assembly is in the first position and a closed configuration when the sliding disc assembly is in the second position.

Additionally, a method of operating a dual spring valve is disclosed, the method comprising providing the dual spring valve comprising a valve body defining a cavity and a sliding disc assembly received in the cavity, the sliding disc assembly comprising a first spring, a second spring, and a disc, wherein a spring force of the second spring is greater than a spring force of the first spring; biasing the sliding disc assembly to a first position within the cavity with the second spring, wherein the disc is spaced from a seat body of the dual spring valve in the first position; applying a fluid force to the disc with fluid in the cavity; and biasing the sliding disc assembly to a second position within the cavity with the first spring and the fluid force, wherein a base surface of the disc engages a seating surface of the seat body in the second position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a dual spring valve and associated methods, systems, devices, and various apparatus. Example aspects of the dual spring valve can comprise a sliding disc assembly configured to seat with a seat body. The sliding disc assembly can comprise a shaft, a disc, and a pair of springs. In some example aspects, the dual spring valve can be a check valve. It would be understood by one of skill in the art that the disclosed dual spring valve is described in but a few exemplary aspects among many. No particular terminology or description should be considered limiting on the disclosure or the scope of any claims issuing therefrom.

Figure 1:
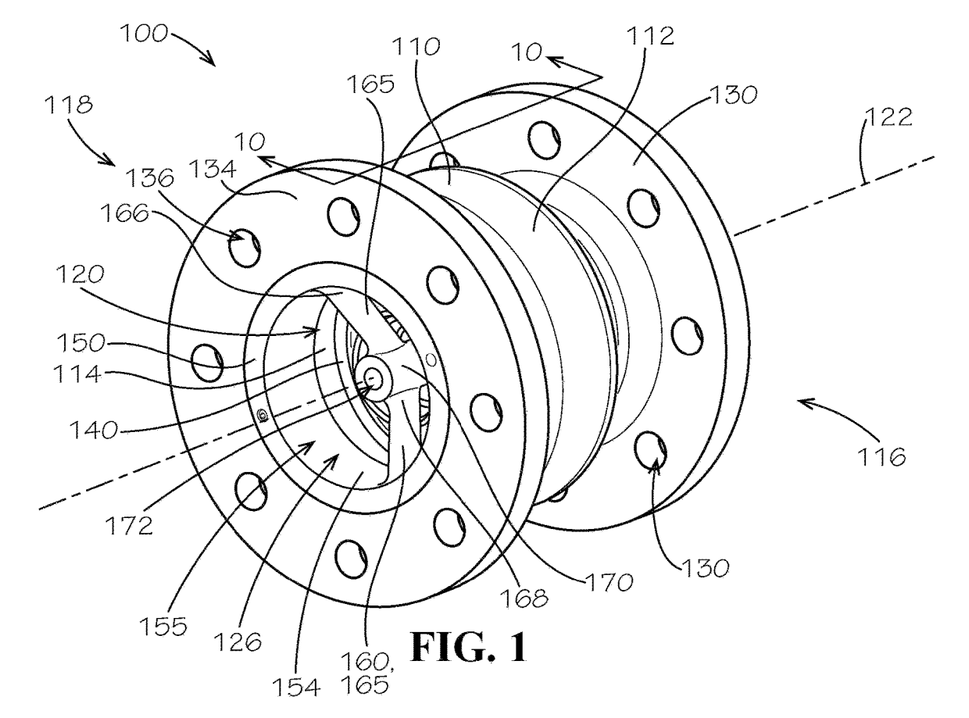
FIG. 1 shows a top perspective view of a dual spring valve in an open configuration, in accordance with one aspect of the present disclosure.
Figure 2:
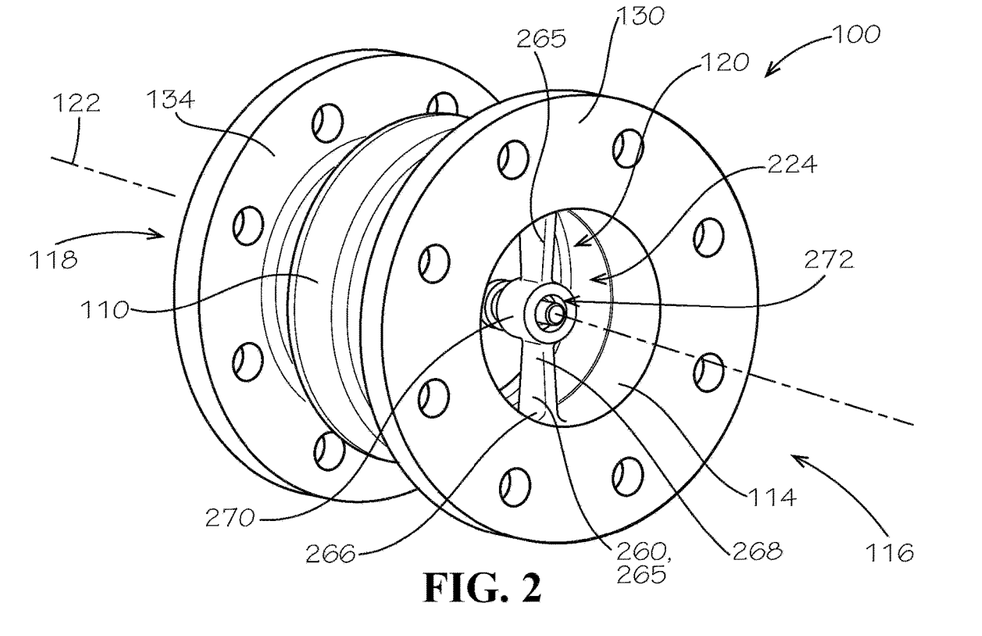
FIG. 2 is a bottom perspective view of the dual spring valve of FIG. 1.

FIGS. 1 and 2 illustrate a top perspective view and a bottom perspective view of a dual spring valve 100, respectively, according to an example aspect of the present disclosure. In the present aspect, the dual spring valve 100 can be a modified dual spring check valve. As shown, the dual spring valve 100 can comprise a valve body 110. The valve body 110 can comprise an outer surface 112 and an inner surface 114, and can further define an inlet end 116 and an outlet end 118. The inner surface 114 can define a cavity 120 formed through the dual spring valve 100, extending from the inlet end 116 to the outlet end 118. A center axis 122 defined by the valve body 110 can extend through a center of the cavity 120. According to example aspects, the cavity 120 can define an inlet region 224 (shown in FIG. 2) proximate to the inlet end 116, an outlet region 126 proximate to the outlet end 118, and a central region 328 (shown in FIG. 3) extending therebetween. Example aspects of the valve body 110 can comprise an inlet flange 130 formed at the inlet end 116 and an outlet flange 134 formed at the outlet end 118. Each of the inlet and outlet flanges 130,134 can extend substantially radially outward, relative to the center axis 122, from outer surface 112 of the valve body 110, as shown. According to example aspects, the valve body 110 can be formed from an iron material, such as, for example, ductile iron. Other example aspects of the valve body 110 can be formed from cast iron, steel, carbon, bronze, another metal material, plastic, or any other suitable material known in the art.

According to example aspects, the dual spring valve 100 can be attached, connected, or otherwise mounted to a piping system. In the present aspect, the piping system can be configured to transport liquids therethrough, such as water, for example and without limitation. In some aspects, the dual spring valve 100 can be positioned between a pipe of the piping system and a secondary valve, which can be a quick-close valve in some aspects. For example, in a particular aspect, the secondary valve can be an air/vacuum valve. For example, the inlet flange 130 of the valve body 110 can be attached to the pipe and the outlet flange 134 of the valve body 110 can be attached to the air/vacuum valve. The piping system and air/vacuum valve can be substantially similar to the piping system and air/vacuum valve disclosed in in U.S. application Ser. No. 16/166,642, filed Oct. 22, 2018, which is hereby specifically incorporated by reference herein in its entirety. In the present aspect, the inlet flange 130 can define one or more inlet mounting bores 132 therethrough and the outlet flange 134 can define one or more outlet mounting bores 136 therethrough. Inlet fasteners (not shown) can extend through the inlet mounting bores 132 and can engage the pipe to couple the dual spring valve 100 to the pipe. Similarly, outlet fasteners (not shown) can extend through the outlet mounting bores 136 and can engage the secondary valve to couple the dual spring valve 100 to the secondary valve. Each of the inlet fasteners and outlet fasteners can be any suitable fastener known in the art, including, but not limited to, nut and bolt assemblies, screws, rivets, and the like. In other aspects, the dual spring valve 100 can be attached to the piping system or the secondary valve by any other suitable attachment mechanisms, such as welding, for example and without limitation.

Figure 3:
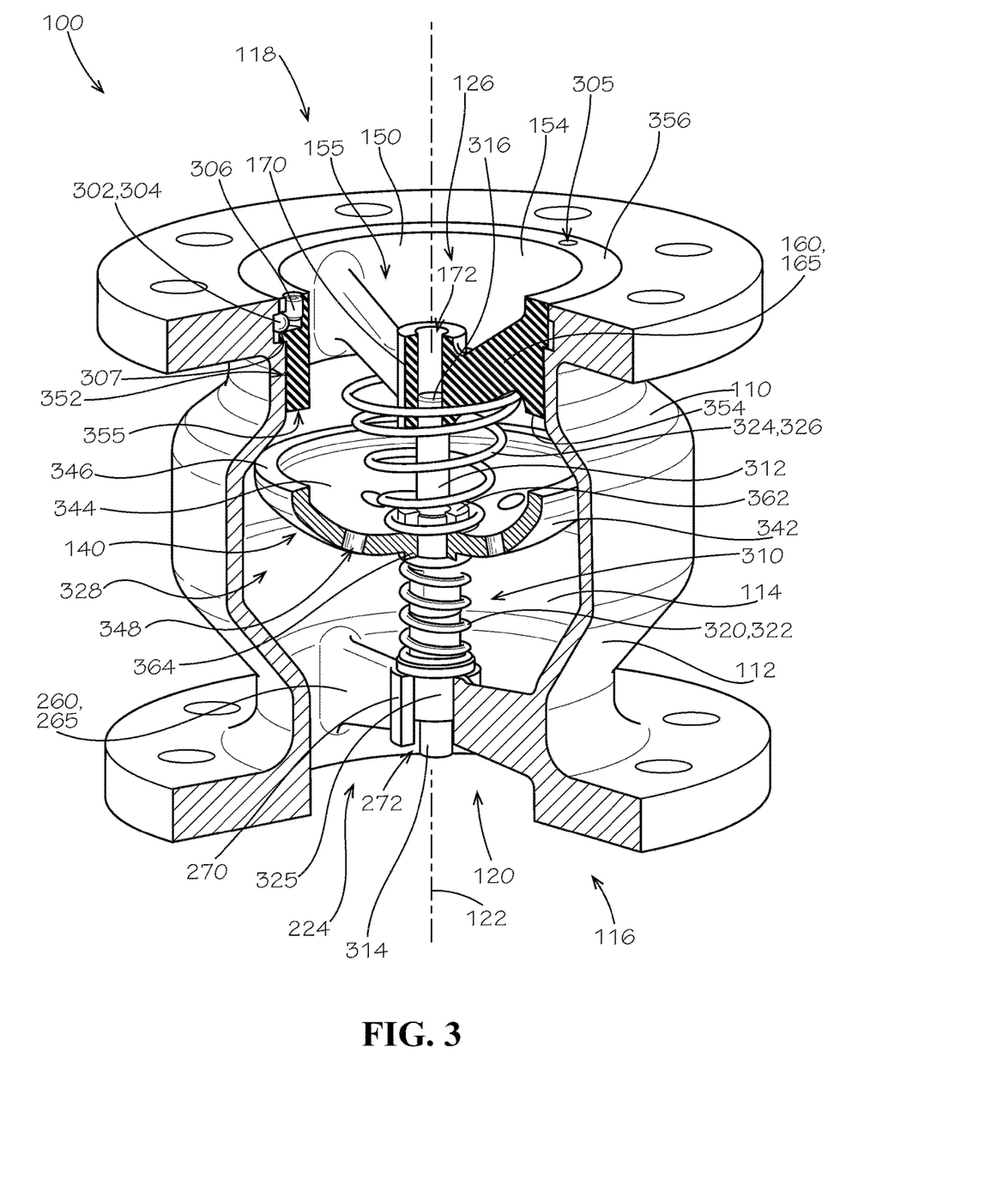
FIG. 3 is a sectional view of the dual spring valve of FIG. 1, illustrating a sliding disc assembly received in a cavity of the dual spring valve.
Figure 10:
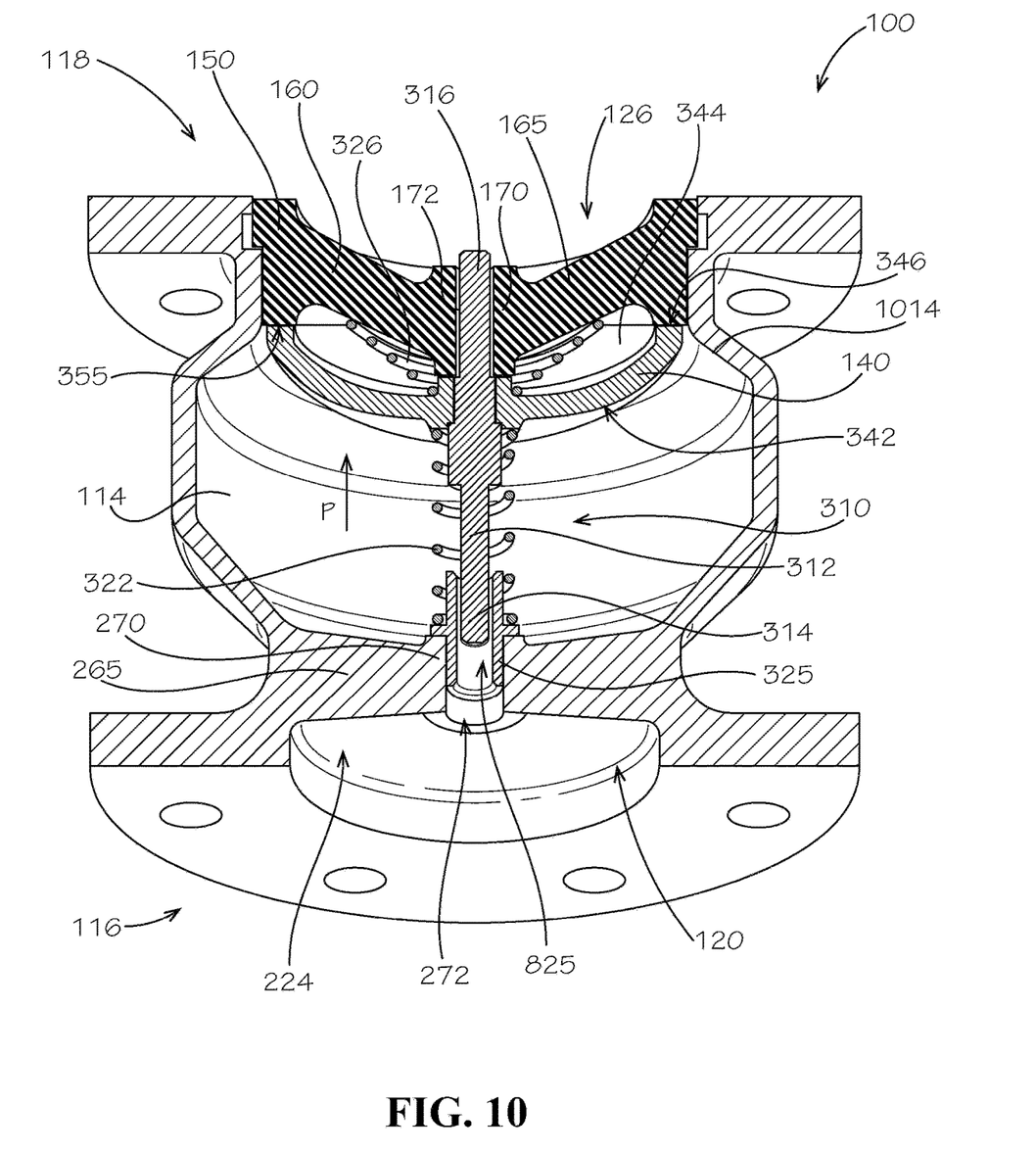
FIG. 10 is a cross-sectional view of the dual spring valve of FIG. 1 taken along line 10-10 in FIG. 1.

According to example aspects, the dual spring valve 100 can be oriented in an open configuration, as shown in FIG. 3, and a closed configuration, as shown in FIG. 10. The dual spring valve 100 can be in the open configuration in normal operation, wherein air can be permitted to flow through the cavity 120 of the dual spring valve 100 between the piping system and the air/vacuum valve. For example, in forward flow conditions, air from the piping system can flow through the cavity 120 of the dual spring valve 100 and into the air/vacuum valve, where it can be released into the atmosphere. Releasing air collected in the piping system can prevent air pockets from forming therein. Air pockets within the piping system can slow the flow of fluid through the piping system or can create an air lock, which can completely stop the flow of fluid through the piping system. Because air tends to collect at high points in the piping system, the dual spring valve 100 and the secondary valve may be connected to the piping system at a high point thereof in example aspects. In reverse flow conditions, air from the atmosphere can flow into the secondary valve, through the dual spring valve 100, and into the piping system. Allowing air to enter the piping system through the dual spring valve 100 can prevent or reduce the likelihood of a vacuum forming within the piping system when the piping system or a portion thereof is being drained. In the closed configuration, however, air and fluid flow through the dual spring valve 100 can be limited, allowing only a small amount of flow therethrough at a slow and measured rate.

According to example aspects, fluid levels in the piping system can rise and fluid can enter the cavity 120 of the dual spring valve 100. To slow the rate of the fluid passing through the cavity 120 and into the secondary valve, the dual spring valve 100 can be provided with a disc 140 configured to seal the cavity 120 and prevent fluid flow around the disc 140 in the closed configuration. The disc can define with one or more small flow openings 348 (shown in FIG. 3) therethrough, which can allow a small amount of gas and/or fluid to flow through the disc 140 at a slow and controlled rate. Example aspects of the disc 140 can be formed from a substantially rigid material, such as metal, and can comprise a substantially resilient coating such as, for example, a rubber coating. For example, in a particular aspect, the disc 140 can be formed from stainless steel and the resilient coating can comprise EPDM rubber. In other aspects, the disc 140 can be formed from any other suitable rigid material, such as any suitable type of metal, plastic, or composite, and the resilient coating of the disc 140 can be formed from Buna-N, PTFE, Viton, neoprene, or any other suitable resilient material known in the art.

As also shown in FIG. 1, example aspects of the dual spring valve 100 can comprise an annular seat body 150 against which the disc 140 can seat in the closed configuration. The annular seat body 150 can be positioned generally within the outlet region 126 of the cavity 120, as shown, and proximate to the outlet flange 134 of the valve body 110. In other aspects, the annular seat body 150 can be positioned elsewhere within the cavity 120, such as the central region 328 (shown in FIG. 3). According to example aspects, the annular seat body 150 can be formed from a resilient material such as, for example, a rubber material, and in some aspects can be formed from EPDM rubber. In other aspects, the annular seat body 150 can be formed from Buna-N, PTFE, Viton, neoprene, or any other suitable material known in the art. According to example aspects, the annular seat body 150 can define a substantially cylindrical outer surface 352 (shown in FIG. 3) and a substantially cylindrical inner surface 154. The inner surface 154 can define a seat channel 155 formed through the annular seat body 150, which can be in fluid communication with the cavity 120 of the valve body 110. Furthermore, in the present aspect, a seat vane assembly 160 can extend substantially radially inward from the seat body 150 into the seat channel 155. The seat vane assembly 160 can comprise a plurality of seat vanes 165, each defining a proximal end 166 and an opposite distal end 168. Each of the seat vanes 165 can extend substantially radially inward from the inner surface 154 of the seat body 150 towards the center axis 122 at the proximal end 166 thereof. The distal end 168 of each seat vane 165 can be joined with an annular seat guide ring 170 or seat guide hub, which can define a seat guide bore 172 therethrough. The seat guide bore 172 can be substantially concentric with the center axis 122, as shown. In the present aspect, the seat vane assembly 160 can be monolithically formed with the annular seat body 150 (i.e., the seat vanes 165, the seat guide ring 170, and the seat body 150 can define a singular or monolithic component.) In other aspects, however, the seat vane assembly 160 or portions thereof may be formed separately from the seat body 150.

Referring to FIG. 2, example aspects of the dual spring valve 100 can further comprise a body vane assembly 260 positioned within the cavity 120. In the present aspect, the body vane assembly 260 can be positioned substantially with the inlet region 224 of the cavity 120, as shown. However, in other aspects, the body vane assembly 260 may be positioned elsewhere within the cavity 120, such as within the central region 328 (shown in FIG. 3). The body vane assembly 260 can comprise a plurality of body vanes 265, each defining a proximal end 266 and an opposite distal end 268. Each of the body vanes 265 can extend substantially radially inward from the inner surface 114 of the valve body 110 towards the center axis 122 at the proximal end 266 thereof. The distal end 268 of each body vane 265 can be joined with an annular body guide ring 270 or body guide hub, which can define a body guide bore 272 therethrough. The body guide bore 272 can be substantially concentric with the center axis 122, as shown. In some aspects, such as the present aspect, the body vanes 265 and the body guide ring 270 can be monolithically formed with the valve body 110, such that the body vane assembly 260 and valve body 110 define a singular or monolithic component. In other aspects, however, the body vane assembly 260 or portions thereof can be formed separately from the valve body 110. According to example aspects, the body vane assembly 260 and seat vane assembly 160 can be configured to reduce the turbulence of air and/or fluid flowing through the cavity 120.

FIG. 3 illustrates a sectional view of the dual spring valve 100, showing various components received in the cavity 120 thereof. As shown, a diameter of the cavity 120 at the inlet and outlet region 224,126 can be substantially equal in some aspects. Furthermore, in various example aspects, a diameter of the cavity 120 at the central region 328 can be greater than the diameter of the cavity 120 at the respective inlet and outlet regions 224,126, as shown. As described above, the annular seat body 150 can be received within the outlet region 126 of the cavity 120. The seat body 150 can define the inner surface 154 and the outer surface 352, and can further define a first end 354 and an opposite second end 356. In example aspects, a substantially annular seating surface 355 can be defined at the first end 354 and can extend between the inner surface 154 and the outer surface 352. The disc 140 can be configured to seat with the annular seating surface 355 in the closed configuration, as described in further detail below. The inner surface 154 of the seat body 150 can define the seat channel 155 extending from the first end 354 to the second end 356, and the outer surface 352 of the seat body 150 can engage the inner surface 114 of the valve body 110. In some aspects, one or more bearings 302 can be provided for retaining the seat body 150 in position within the cavity 120. For example, as shown, the bearings 302 can be ball bearings 304, and each of the ball bearings 304 can be received within a corresponding bearing bore 305 of the seat body 150. As shown, the bearing bores 305 can extend into the seat body 150 at the second end 356 thereof. Furthermore, a bearing opening 307 can be formed in the outer surface 352 of the seat body 150 proximate to each of the bearing bores 305, and each bearing opening 307 can meet the corresponding one of the bearing bores 305. Each of the ball bearings 305 can extend partially through the corresponding bearing opening 307 defined in the outer surface 352 of the seat body 150 to engage the inner surface 114 of the valve body 110. A fastener, such as a set screw 306, as shown, can be received within each of the bearing bores 305 to retain the corresponding ball bearing 304 therein. Furthermore, in some aspects, the set screws 306 can be tightened against the corresponding ball bearings 304 to push the corresponding ball bearings 304 further through the corresponding bearing openings 307. Thus, as the set screws 306 are tightened, the ball bearings 304 can be increasingly pressed against the inner surface 114 of the valve body 110. The engagement of the ball bearings 304 with the inner surface 114 can retain the seat body 150 in position relative to the valve body 110. In other aspects, any other suitable fastener can be provided for retaining each of the ball bearings 304 in the corresponding bearing bores 305 and/or pushing the ball bearings 304 into the corresponding bearing openings 307.

As shown, the seat vanes 165 of the seat vane assembly 160 can extend substantially radially inward from the inner surface 154 of the seat body 150 to the seat guide ring 170. The seat guide ring 170 can define the seat guide bore 172. In some example aspects, the seat vanes 165 can be angled towards the inlet end 116, as shown. In other aspects, however, the seat vanes 165 may be angled toward the outlet end 118, or may not be angled towards either of the inlet or outlet ends 116, 118. Furthermore, as shown, the body vanes 265 of the body vane assembly 260 can extend substantially radially inward from the inner surface 114 of the valve body 110 at the inlet region 224 of the cavity 120 to the body guide ring 270. The body guide ring 270 can define the body guide bore 272 therethrough. In some aspects, a bushing 325 can be mounted to the body guide ring 270 and can define a bushing bore 825 (shown in FIG. 8), as described in further detail below.

According to example aspects, the dual spring valve 100 can comprise a sliding disc assembly 310 positioned within the cavity 120 and supporting the disc 140 therein. The sliding disc assembly 310 can comprise a shaft 312 slidably mounted within the cavity 120 and extending substantially along and aligned with the center axis 122. The sliding disc assembly 310 can further comprise the disc 140 mounted on the shaft 312, a first biasing element 320 mounted on the shaft 312, and a second biasing element 324 mounted on the shaft 312. Example aspects of the shaft 312 can generally define an elongate cylindrical shape having a first end 314 oriented proximate the inlet region 224 and an opposite second end 316 oriented proximate the outlet region 126. The sliding disc assembly 310 can be configured to slide axially within the cavity 120, substantially along the center axis 122, between a first position and a second position. Thus, the first end 314 of the shaft 312 can slidably engage the body guide bore 272 of the body guide ring 270 and the second end 316 of the shaft 312 can slidably engage the seat guide bore 172 of the seat guide ring 170. In the first position, the dual spring valve 100 can be in the open configuration, as shown, and in the second position, the dual spring valve 100 can be in the closed configuration.

According to example aspects, the first biasing element 320 can comprise a first spring 322 configured to aid in biasing the dual spring valve 100 to the closed configuration, and further configured to slow the movement of the dual spring valve 100 from the closed configuration to the open configuration. Similarly, the second biasing element 324 can be a second spring 326 configured to aid in biasing the dual spring valve 100 to the open configuration, and further configured to slow the movement of the dual spring valve 100 from the open configuration to the closed configuration. Each of the first and second springs 322,326 can comprise a compression spring in the present aspect, but in other aspects, either or both of the first and second springs 322,326 can be any other suitable type of spring known in the art. Slowing the movement of the dual spring valve 100 between the open and closed configurations can allow for smoother, more controlled operation. It can also be particularly beneficial to slow the movement of the dual spring valve 100 to the closed configuration to prevent damage that can occur when the dual spring valve 100 closes.

As shown, the first spring 322 can be mounted on the shaft 312 and can extend between the disc 140 and the body vane assembly 260. More specifically, in example aspects, the first spring 322 can extend between a lower disc surface 342 of the disc 140 and the bushing 325. The first spring 322 can bias the disc 140 away from the body vane assembly 260 and towards the seat body 150, and thus, towards the closed configuration. The first spring 322 can be substantially cylindrical in the present aspect, but can define any other suitable shape in other aspects. The second spring 326 can also be mounted on the shaft 312 and can extend between the disc 140 and the seat vane assembly 160. More specifically, the second spring 326 can extend between an upper disc surface 344 of the disc 140 and the seat vanes 165. In the present aspect, the second spring 326 can substantially define the shape of a truncated cone. That is to say, the second spring 326 can define a spring diameter that can taper along a length thereof. For example, in the present aspect, the spring diameter of the second spring 326 can taper towards the disc 140, such that the spring diameter of the second spring 326 proximate to the disc 140 can be less than the spring diameter of the second spring 326 proximate to the seat vane assembly 160. In other aspects, the second spring 326 can define any other suitable shape.

The sliding disc assembly 310 can further comprise the disc 140 mounted to the shaft 312. The disc 140 can be positioned on the shaft 312 between the first and second springs 322,326, and thus between the body and seat vane assemblies 270,160. According to example aspects, the disc 140 can be substantially bowl-shaped. For example, as shown, the disc 140 can define the lower disc surface 342 and the upper disc surface 344, each of which can be substantially hemispherical, and an annular base surface 346 extending therebetween. The annular base surface 346 can face towards the annular seating surface 355 of the seat body 150 and can be configured to seat with the annular seating surface 355 in the closed configuration of the dual spring valve 100. In example aspects, the disc 140 may also define one or more flow openings 348 extending from the lower disc surface 342 to the upper disc surface 344, which can allow gas and/or fluid to flow therethrough at a slow, controlled rate. Example aspects of the disc 140 can also define a central opening 560 (shown in FIG. 5) therethrough, through which the shaft 312 can extend to mount the disc 140 on the shaft 312. The central opening 560 can be substantially concentric to the center axis 122.

In some aspects, an upper flange 362 can extend from the upper disc surface 344 of the disc 140 and can surround the central opening 560, as shown. The upper flange 362 can reinforce the disc 140 at the central opening 560, and may also aid in positioning the second spring 326 relative to the disc 140, as described in further detail with respect to FIG. 6. Similarly, in some aspects, a lower flange 364 can extend from the lower disc surface 342 of the disc 140 and can surround the central opening 560. The lower flange 364 can further reinforce the disc 140 at the central opening 560, and may aid in positioning the first spring 322 relative to the disc 140, as described in further detail with respect to FIG. 8. According to example aspects, the reinforcement provided by each of the upper and lower flanges 362,362 can aid in maintaining the proper orientation of disc 140, by preventing undesirable bending, folding, or twisting of the disc 140 at or near the central opening 560. Additionally, as described above, the first and second springs 322,326 can engage the lower and upper disc surfaces 342,344 of the disc 140, respectively, thus sandwiching the disc 140 therebetween and further aiding in maintaining the proper orientation of the disc 140.

In example aspects, the second spring 326 can define a spring force that can be greater than a spring force of the first spring 322. The spring force of the second spring 326 can overcome that of the first spring 322 to expand the second spring 326 between the seat vane assembly 160 and the upper disc surface 344, and to compress the first spring 322 between the lower disc surface 342 and the body vane assembly 260. As the second spring 326 is expanded and the first spring 322 is compressed, the shaft 312 and the disc 140 can be biased away from the seat body 150 and towards the inlet end 116 of the dual spring valve 100, thus naturally orienting the sliding disc assembly 310 in the first position and the dual spring valve 100 in the open configuration, as shown. As described above, the shaft 312 can be configured to slide within the seat guide bore 172 of the seat guide ring 170 and the body guide bore 272 of the body guide ring 270 to allow for movement of the sliding disc assembly 310 between the first and second positions. As shown, with the sliding disc assembly 310 in the first position and the dual spring valve 100 in the open configuration, the disc 140 can be spaced from the seat body 150 and can be oriented within the central region 328 of the cavity 120. The disc 140 and the central region 328 can be sized such that air can flow around the disc 140 and through the cavity 120 from the inlet end 116 to the outlet end 118, or vice versa. Air can also flow through the flow openings 348 formed in the disc 140. Thus, in a particular aspect, in the open configuration, air from the piping system can be released into the atmosphere through the dual spring valve 100 to prevent the formation of air pockets in the piping system. Furthermore, in the open configuration, air from the atmosphere can be admitted to the piping system through the dual spring valve 100 to prevent the formation of a vacuum in the piping system.

Figure 4:
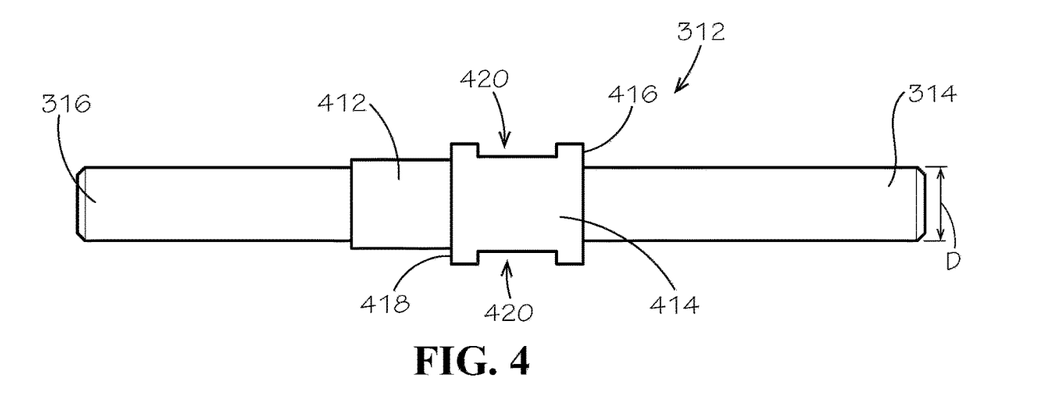
FIG. 4 is a side view of a shaft of the sliding disc assembly of FIG. 3.

FIG. 4 illustrates the shaft 312, according to an example aspect of the present disclosure. As shown, the shaft 312 generally defines the elongate cylindrical shape generally defining a shaft diameter D. The shaft 312 also defines the first end 314 and the opposite second end 316. According to example aspects, a disc portion 412 of the shaft 312 can be positioned at a location along the shaft 312 between the first and second ends 314,316 thereof and can be configured to extend through the central opening 560 (shown in FIG. 5) formed through the disc 140 (shown in FIG. 3). In some aspects, the disc portion 412 of the shaft 312 can define an increased diameter as compared to the shaft diameter D. Various aspects of the shaft 312 can also define a bearing journal 414 oriented adjacent to the disc portion 412 and positioned along the shaft 312 between disc portion 412 and the first end 314. In some aspects, the bearing journal 414 can define an increased diameter as compared to the shaft diameter D, and also as compared to the diameter of the disc portion 412, as shown. As such, the bearing journal 414 can define an annular first shoulder 416 distal to the disc portion 412 and an annular second shoulder 418 proximate to the disc portion 412. In the first position of the sliding disc assembly 310 (shown in FIG. 3) (i.e., in the open configuration of the dual spring valve 100, as shown in FIG. 3), the bearing journal 414 can be configured to extend between the lower disc surface 342 (shown in FIG. 3) of the disc 140 and the bushing 325 (shown in FIG. 3). The first shoulder 416 can abut the bushing 325 in the first position to prohibit the shaft 312 from advancing further through the body guide bore 272 (shown in FIG. 2) of the body guide ring 270 (shown in FIG. 2). In the second position of the sliding disc assembly 310, the shaft 312 can slide axially away from the bushing 325, and the bearing journal 414 thereof can disengage the bushing 325. In some aspects, the bearing journal 414 can further define one or more recessed regions 420 formed therein; however, other aspects may not define the recessed regions 420.

Figure 5:
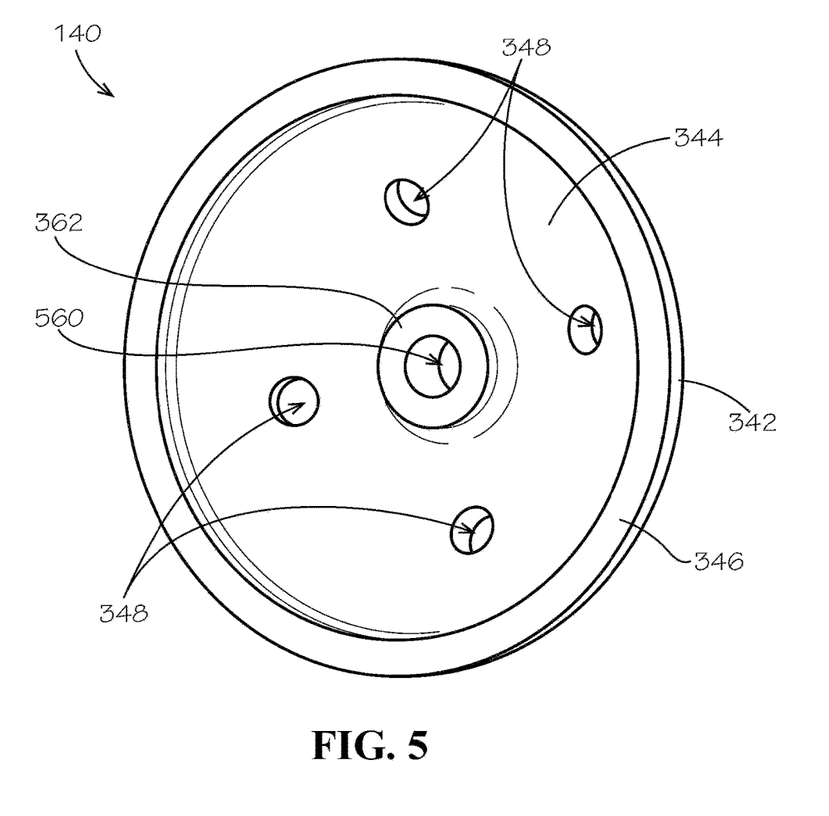
FIG. 5 is top view of a disc of the sliding disc assembly of FIG. 3.

FIG. 5 illustrates a top perspective view of the disc 140. As shown, the disc 140 defines the substantially hemispherical lower disc surface 342 and the substantially hemispherical upper disc surface 344. The annular base surface 346 of the disc 140 extends about and between the circumferences of the lower and upper disc surfaces 342,344. The base surface 346 can be substantially planar, as shown. Furthermore, the central opening 560 can extend through the disc 140 generally at a center thereof. The central opening 560 can be sized to receive the disc portion 412 (shown in FIG. 4) of the shaft 312 (shown in FIG. 4) therethrough. The upper flange 362 can project from the upper disc surface 344 and can encircle the central opening 560. Similarly, the lower flange 364 (shown in FIG. 3) can project from the lower disc surface 342 and can encircle the central opening 560. As such, in example aspects, the upper and lower flanges 362,364 can be configured to substantially surround the disc portion 412 when the disc 140 is mounted on the shaft 312. Additionally, the flow openings 348 can be formed through the disc 140, extending from the upper disc surface 344 to the lower disc surface 342 thereof. The flow openings 348 can allow the passage of air or fluid therethrough in both the open and closed configurations of the dual spring valve 100 (shown in FIG. 1).

Figure 6:
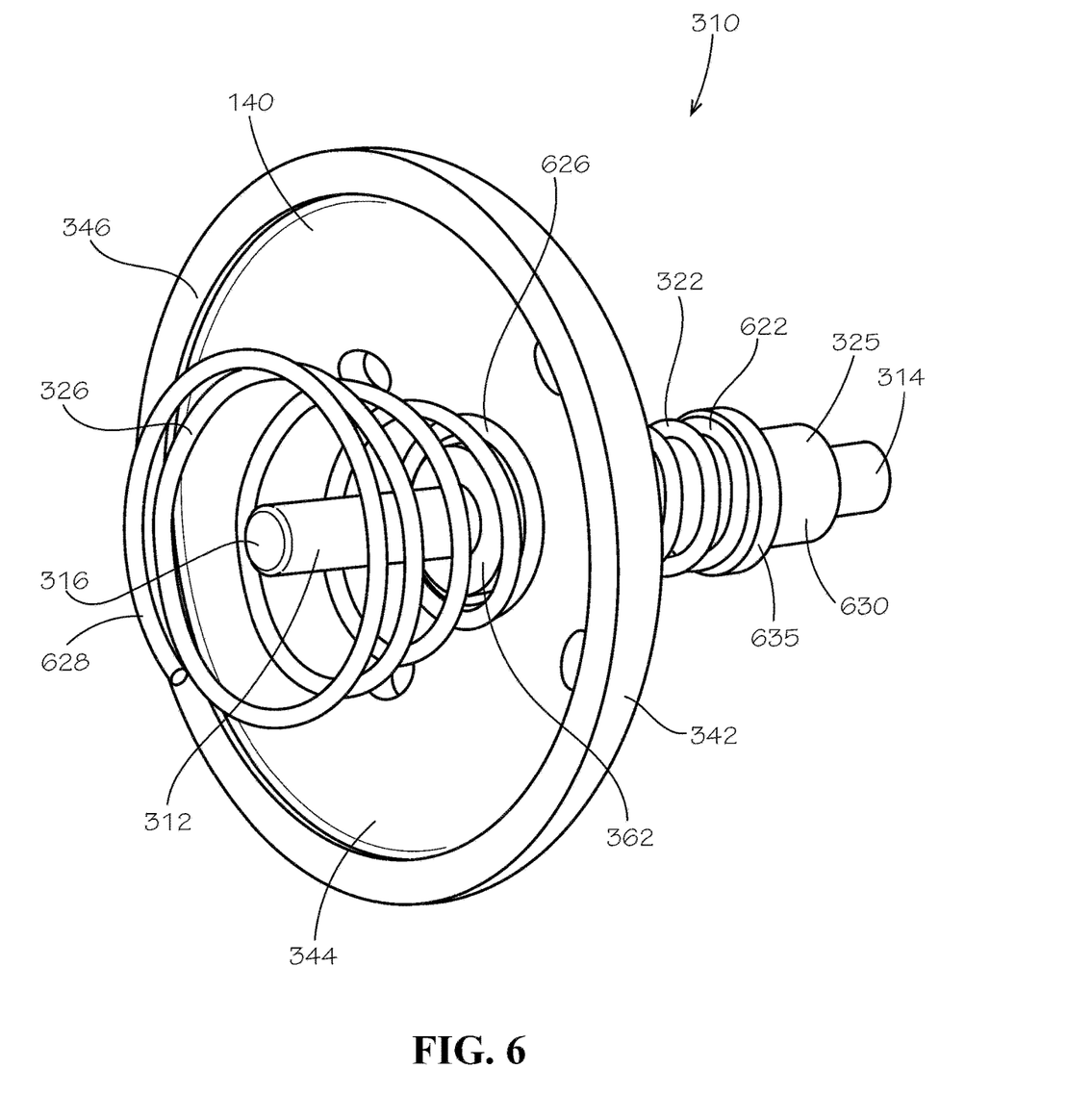
FIG. 6 is a top perspective view of the sliding disc assembly of FIG. 3.

FIG. 6 illustrates a top perspective view of the sliding disc assembly 310. As shown, the disc 140 can be mounted on the shaft 312. Moreover, the first spring 322 can be mounted on the shaft 312 and can extend from the lower disc surface 342 of the disc 140 towards the first end 314 of the shaft 312, and the second spring 326 can be mounted on the shaft 312 and can extend from the upper disc surface 344 of the disc 140 towards the second end 316 of the shaft 312. Example aspects of the first spring 322 can define a lower spring end 622 proximate to the first end 314 of the shaft 312 and an upper spring end 824 (shown in FIG. 8) proximate to the disc 140. In the present aspect, the first end 314 of the shaft 312 is illustrated extending through the bushing bore 825 (shown in FIG. 8) of the bushing 325. The bushing 325 can comprise a bushing body 630, which can define the bushing bore 825 therethrough, and a bushing flange 635 extending radially outward from the bushing body 630. A portion of the bushing body 630 can extend into the first spring 322 at the lower spring end 622 thereof, and the lower spring end 622 can abut the bushing flange 635, as described in further detail below. Example aspects of the second spring 326 can define a lower spring end 626 oriented proximate to the disc 140 and an upper spring end 628 proximate to the second end 316 of the shaft 312. The spring diameter of the second spring 326 can taper from the upper spring end 628 to the lower spring end 626, as shown. In example aspects, the upper flange 362 can extend into the second spring 326 at the lower spring end 626 thereof, thereby preventing or limiting lateral movement of the second spring 326 relative to the disc 140.

Figure 7:
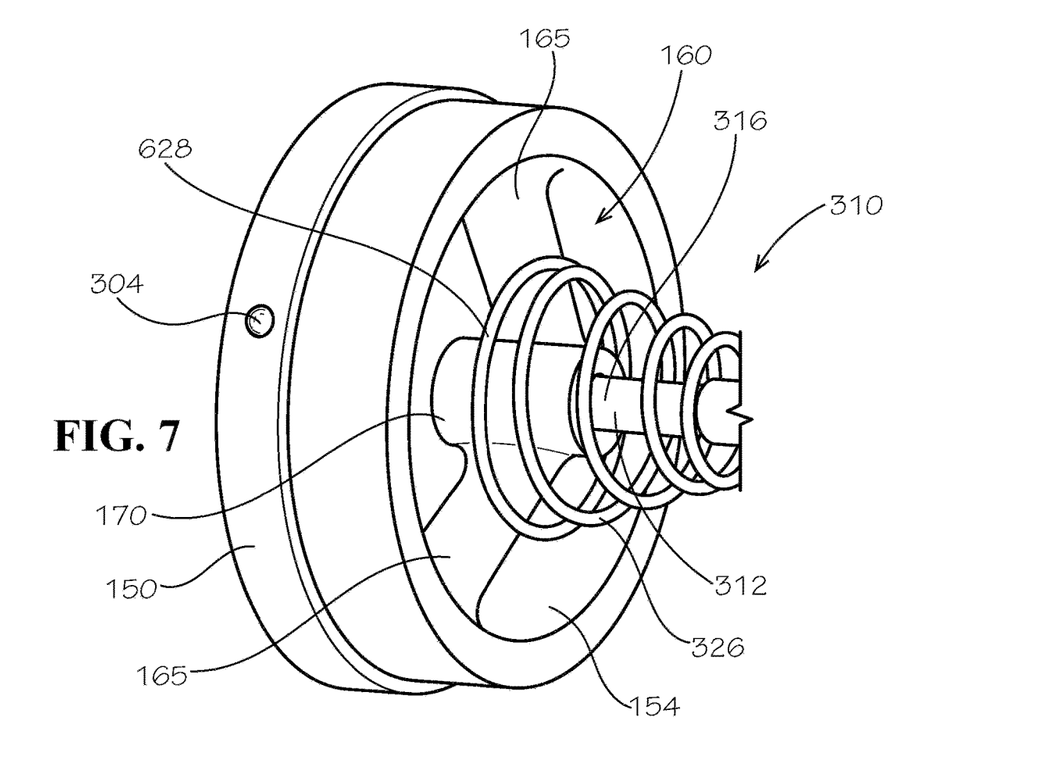
FIG. 7 is a bottom perspective view of the sliding disc assembly of FIG. 3 engaging a seat vane assembly of the dual spring valve of FIG. 1.

FIG. 7 illustrates the engagement of the sliding disc assembly 310 with the seat vane assembly 160. As shown, in the present aspect, the seat vane assembly 160 can be monolithically formed with the annular seat body 150. The seat vane assembly 160 can comprise the seat vanes 165 and the seat guide ring 170, wherein the seat vanes 165 can extend radially inward from inner surface 154 of the seat body 150 to join with the seat guide ring 170. The second end 316 of the shaft 312 can slidably engage the seat guide bore 172 (shown in FIG. 1) of the seat guide ring 170, and can move axially therein as the sliding disc assembly 310 moves between the first and second positions. As shown, the second spring 326 can be mounted on the shaft 312, and the upper spring end 628 thereof can abut the seat vane assembly 160. For example, in the present aspect, the upper spring end 628 of the second spring 326 end can engage each of the seat vanes 165. The lower spring end 626 (shown in FIG. 6) of the second spring 326 can engage the upper disc surface 344 (shown in FIG. 3) of the disc 140 (shown in FIG. 3), as described above.

Figure 8:
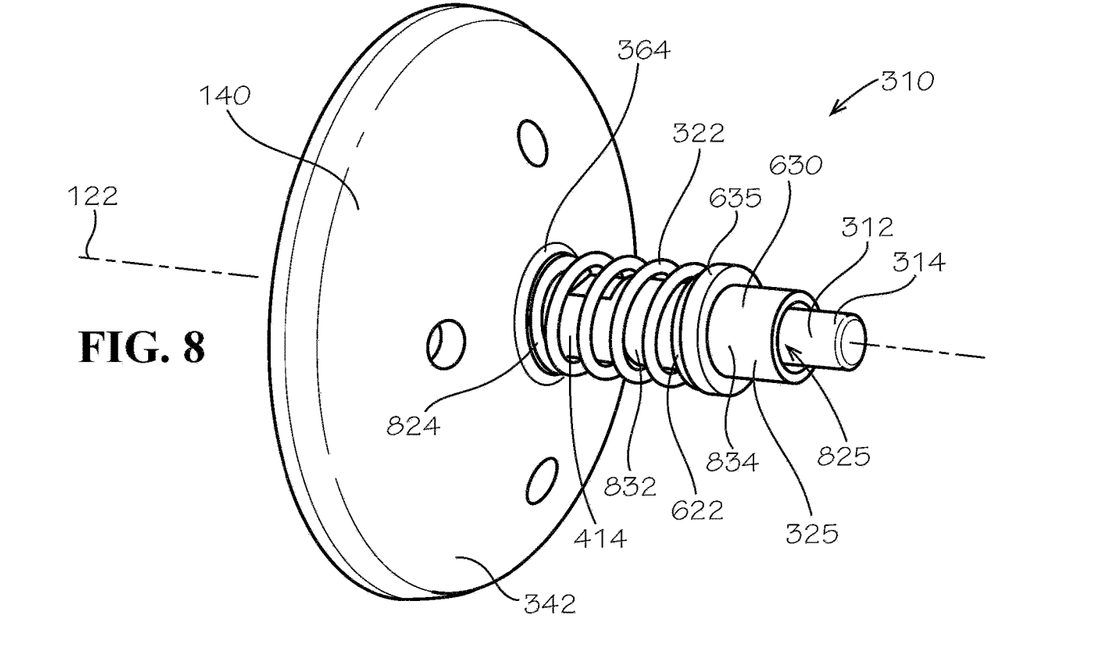
FIG. 8 is a bottom perspective view of the sliding disc assembly of FIG. 3.

FIG. 8 illustrates a bottom perspective view of the sliding disc assembly 310. The bushing 325 is also illustrated, with the first end 314 of shaft 312 extending slidably through the bushing bore 825 thereof. As shown, the disc 140 and the first spring 322 can be mounted on the shaft 312. In example aspects, the disc portion 412 (shown in FIG. 4) of the shaft 312 can be received through the central opening 560 (shown in FIG. 3) of the disc 140, and the bearing journal 414 of the shaft 312 can be oriented proximate to, and in some instances can engage, the lower disc surface 342 of the disc 140. For example, in the present aspect, the second shoulder 418 (shown in FIG. 4) of the bearing journal 414 can abut the lower flange 364 of the lower disc surface 342 of the disc 140. As shown, the first spring 322 can define the upper spring end 824 and the lower spring end 622. The upper spring end 824 can engage the lower disc surface 342 and can extend from the lower disc surface 342 of the disc 140 towards the first end 314 of the shaft 312. In the present aspect, the upper spring end 824 can abut the lower flange 364 extending from the lower disc surface 342 of the disc 140. As such, as shown, the bearing journal 414 of the shaft 312 can extend within the first spring 322 at the upper spring end 824. In other aspects, the lower flange 364 may also be configured to extend within the first spring 322 at the upper spring end 824 thereof.

As shown, the bushing 325 can define the bushing body 630 and the bushing flange 635 extending radially therefrom. The bushing body 630 can define the bushing bore 825, as shown, and the first end 314 of the shaft 312 can extend slidably therethrough. The bushing body 630 can further define an upper body portion 832 extending from bushing flange 635 towards the disc 140 and a lower body portion 834 extending from the bushing flange 635 away from the disc 140. In example aspects, as shown, the upper body portion 832 of the bushing body 630 can be configured to extend into the first spring 322 at the lower spring end 622 thereof, and the lower spring end 622 can abut the bushing flange 635. As such, as the sliding disc assembly 310 moves between the first and second positions (i.e., the dual spring valve 100 of FIG. 1 moves between the open and closed configurations, respectively), the first spring 322 can be expanded and compressed between the disc 140 and the bushing flange 635. According to example aspects, the size of the bearing journal 414 of the shaft 312 and the upper body portion 832 of the bushing 325 extending through the first spring 322 can be configured to prohibit or limit lateral movement of the first spring 322. In example aspects, the lower body portion 834 of the bushing 325 can engage the body guide bore 272 (shown in FIG. 2) of the body guide ring 270 (shown in FIG. 2) to mount the bushing 325 on the body guide ring 270, as shown and described in further detail with respect to FIG. 9.

Figure 9:
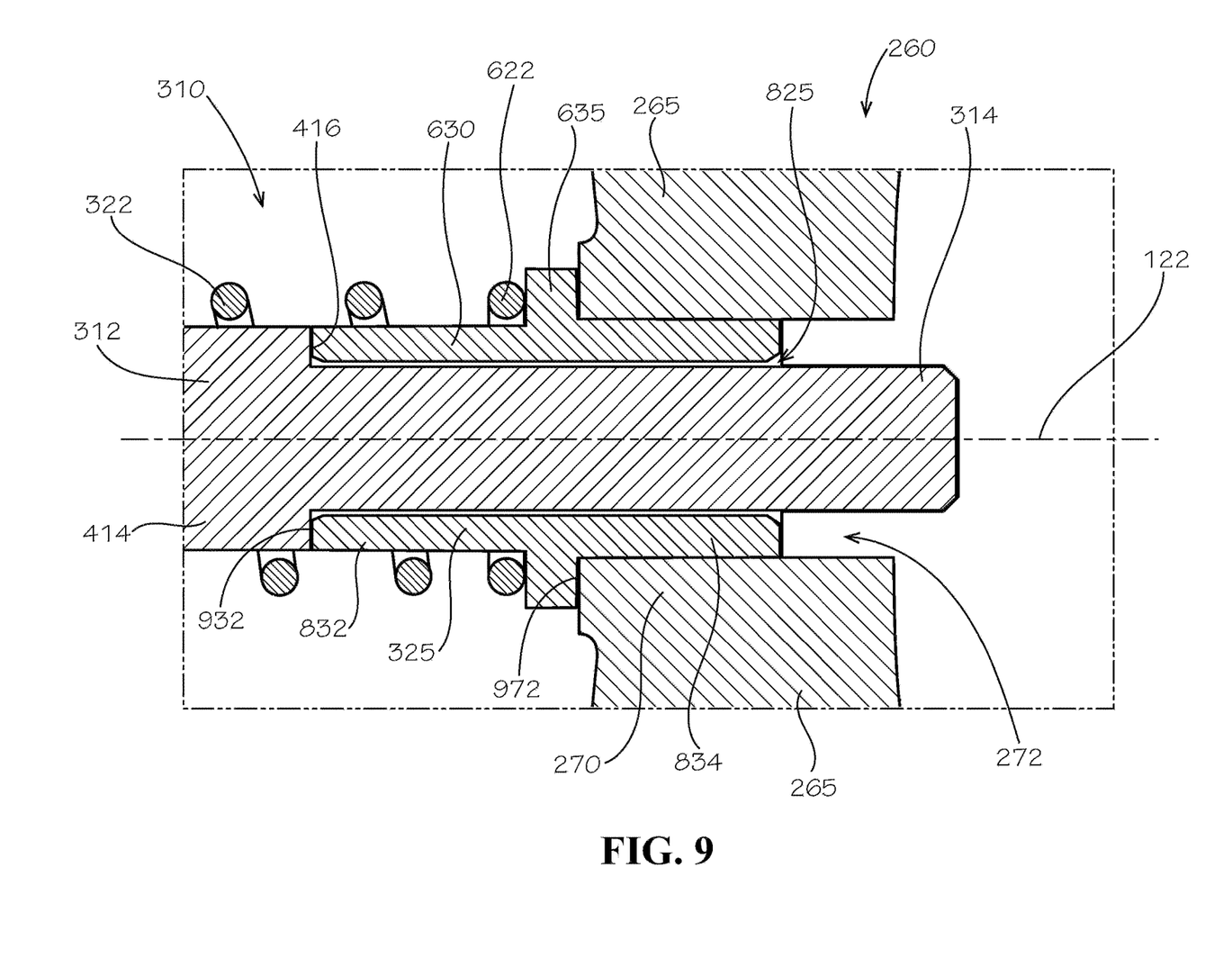
FIG. 9 is a detail cross-sectional view of the sliding disc assembly of FIG. 3 engaging a body vane assembly of the dual spring valve of FIG. 1, taken along line 10-10 in FIG. 1.

FIG. 9 illustrates a detail cross-sectional view of the engagement of the sliding disc assembly 310 with the body vane assembly 260. As shown, the body vane assembly 260 can comprise the body vanes 265 joined with the body guide ring 270, and the body guide ring 270 can define the body guide bore 272 therethrough. The bushing 325 can define the bushing body 630 and the bushing flange 635, and the bushing body 630 can define the upper body portion 832 and the lower body portion 834. As shown, the lower body portion 834 of the bushing 325 can extend into the body guide bore 272, and the bushing flange 635 can abut an upper ring end 972 of the body guide ring 270. Each of the bushing bore 825 and the body guide bore 272 can be substantially concentric with the center axis 122. The first end 314 of the shaft 312 can extend into the bushing bore 825 at the upper body portion 832, and can extend at least partially through the body guide bore 272, as shown. According to example aspects, the shaft 312 can be slidably engaged with the bushing bore 825 and body guide bore 272, such that the shaft 312 can move axially therein as the sliding disc assembly 310 moves between the first and second positions. In example aspects, in the first position of the sliding disc assembly 310, the first shoulder 416 of the bearing journal 414 of the shaft 312 can abut an upper body end 932 of the upper body portion 832 of the bushing 325 to limit the axial movement of the shaft 312 through the bushing bore 825 and body guide bore 272. Furthermore, as shown, the upper body portion 832 of the bushing body 630 can extend into the first spring 322 at the lower spring end 622 thereof, and the lower spring end 622 can abut the bushing flange 635. The opposite upper spring end 824 (shown in FIG. 8) of the first spring 322 can engage the lower disc surface 342 (shown in FIG. 8) of the disc 140 (shown in FIG. 8), as described above.

FIG. 10 illustrates the sliding disc assembly 310 in the second position and the dual spring valve 100 in the closed configuration. As described above, in normal operation, the dual spring valve 100 can be in open configuration and air can be permitted to flow through the cavity 120. The spring force of the second spring 326 can be greater than the spring force of the first spring 322, and can thus bias the sliding disc assembly 310 to the first position, as shown in FIG. 3. However, in abnormal conditions, fluid levels in the piping system can rise, and fluid can enter the cavity 120 of the dual spring valve 100 at the inlet region 224. The fluid can rise within the cavity 120 generally from the inlet region 224 towards the outlet region 126. According to example aspects, the rising fluid (or a rush of air resulting from the rising fluid) can apply pressure (i.e., a fluid force) to the lower disc surface 342 of the disc 140 generally in the axial direction, as indicated by directional arrow P. In certain conditions, the pressure applied to the disc 140 can be great enough to overcome the spring force of the second spring 326 to bias the sliding disc assembly 310 towards the outlet end 118 and compress the second spring 326 between the disc 140 and the seat vane assembly 160. For example, in conditions where the flow of fluid into the cavity 120 is rapid and/or turbulent, the pressure can be great enough to overcome the spring force of the second spring 326. In example aspects, the spring force of the first spring 322 can also aid in biasing the sliding disc assembly 310 towards the outlet end 118. As the sliding disc assembly 310 is biased towards the outlet end 118, the sliding disc assembly 310 can move from the first position, wherein the dual spring valve 100 is in the open configuration, to the second position, as shown, wherein the dual spring valve 100 is in the closed configuration.

According to exampling aspects, the spring force of the second spring 326 can provide some resistance as the sliding disc assembly 310 moves towards the second position, thus preventing the dual spring valve 100 from slamming closed. It can be desirable to prevent the dual spring valve 100 from slamming closed, as damage can occur to the dual spring valve 100 during a forceful closure. However, it can also be desirable to quickly close the dual spring valve 100 before fluid can flow around the disc 140, and the spring force of the first spring 322 can aid in quickly closing the dual spring valve 100 as the fluid rises in the cavity 120. Furthermore, in turbulent flow conditions, the body vanes 265 and/or seat vanes 165 can aid in reducing the turbulence of the fluid as it flows through the cavity 120. Fluid turbulence can cause vibrations that can result in failure of the dual spring valve 100 and/or the air/vacuum valve (shown in FIG. 7). Thus, reducing the turbulence of the fluid can reduce the likelihood of valve failure. In other instances, however, the pressure applied to the disc 140 can be minimal. For example, the pressure resulting from a slow and/or gentle flow of fluid into the cavity 120 may not be great enough to overcome the spring force of the second spring 326, and the dual spring valve 100 can remain in the open configuration.

When the pressure applied to the disc 140 by the rising fluid (or a rush of air), in combination with the spring force of the first spring 322, is greater than the spring force of the second spring 326, the sliding disc assembly 310 can be slid axially towards the outlet end 118 of the dual spring valve 100 from the first position to the second position. The first end 314 of the shaft 312 can slid within the bushing bore 825 and the body guide bore 272, and the second end 316 of the shaft 312 can slide within the seat guide bore 172. The first spring 322 can be expanded between the bushing 325 and the lower disc surface 342 of the disc 140, and the second spring 326 can be compressed between the seat vane assembly 160 and the upper disc surface 344 of the disc 140. According to example aspects, as shown, a tapered portion 1014 of the inner surface 114 of the valve body 110 can taper towards the annular seat body 150, such that the diameter of the cavity 120 at the tapered portion 1014 can gradually decrease towards the outlet region 126. Thus, as the sliding disc assembly 310 moves towards the second position and the disc 140 moves towards the seat body 150, a clearance between the inner surface 114 and the disc 140 can be gradually reduced. As the clearance is reduced, the rate of air and/or fluid flow around the disc 140 can be diminished. In the second position of the sliding disc assembly 310, the annular base surface 346 of the disc 140 can engage the annular seating surface 355 of the seat body 150 to create a seal therebetween, thus preventing the fluid from flowing around the disc 140 and orienting the dual spring valve 100 in the closed configuration. According to example aspects, the spring force of each of the first and second springs 322,326 can be selected as desired, and can determine the amount of pressure required to overcome the spring force of the second spring 326 and to move the sliding disc assembly 310 from the first position to the second position.

With the dual spring valve 100 in the closed configuration and fluid prevented from flowing around the disc 140, a limited amount of fluid can continue to flow through the flow openings 348 (shown in FIG. 3) formed through the disc 140 at a slow and measured rate. Slowing and controlling the rate at which fluid enters the air/vacuum valve, or other secondary valve, can prevent fluid hammer (e.g., water hammer) from occurring in the air/vacuum valve. Fluid hammer can occur when the air/vacuum valve abruptly closes, which can cause the fluid flowing into the air/vacuum valve to stop abruptly. The surge of pressure resulting from the abrupt cessation of the fluid can create shock waves within the air/vacuum valve and/or piping system that can cause damage to the air/vacuum valve and/or piping system. Thus, the dual spring valve 100 can aid in preventing such fluid hammer.

Once the flow of fluid from the piping system into the dual spring valve 100 slows, the pressure on either side of the disc 140 can begin to equalize. Once the pressure biasing the sliding disc assembly 310 to the second position can no longer overcome the spring force of the second spring 326, the second spring 326 can bias the sliding disc assembly 310 back to the first position, thus reorienting the dual spring valve 100 in the open configuration. According to example aspects, the spring force of the first spring 322 can provide some resistance as the sliding disc assembly 310 moves back to the first position, thus preventing the dual spring valve 100 from slamming open and reducing the likelihood of damage occurring to the dual spring valve 100 upon opening. As the fluid level in the piping system drops, fluid in the air/vacuum valve can flow back through the cavity 120 of the dual spring valve 100 from the outlet region 126 to the inlet region 224 and back into the piping system. Air can then once again flow between the piping system and the air/vacuum valve, as needed.

Thus, according to example aspects, a method of operating the dual spring valve 100 can comprise providing the dual spring valve 100, wherein the dual spring valve 100 can comprise the valve body 110 defining the cavity 120 and the sliding disc assembly 310 received in the cavity. The sliding disc assembly 310 can comprise the first spring 322, the second spring 326, and the disc 140, wherein the spring force of the second spring 326 can be greater than the spring force of the first spring 322. The method can also comprise biasing the sliding disc assembly 310 to the first position within the cavity 120 with the second spring 326, wherein the disc 140 can be spaced from the seat body 150 in the first position. The method can further comprise applying a fluid force to the disc 140 as the fluid rises with the cavity 120 and biasing the sliding disc assembly 310 to the second position within the cavity 120 with the first spring 322 and the fluid force. The base surface 346 of the disc 140 can engage the seating surface 355 of the seat body 150 in the second position.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A sliding disc assembly for a dual spring valve comprising:
   a shaft defining a first end and a second end;
   a disc mounted on the shaft between the first end and the second end, the disc defining an upper disc surface, a lower disc surface, and an annular base surface;
   a first spring mounted on the shaft between the lower disc surface and the first end of the shaft; and
   a second spring mounted on the shaft between the upper disc surface and the second end of the shaft, wherein the first spring defines a spring force that is different from a spring force of the second spring;
   wherein the shaft defines a bearing journal oriented between the first end and the second end, the bearing journal defining a first shoulder and a second shoulder opposite the first shoulder.

2. The sliding disc assembly of claim 1, wherein:
   the shaft defines a shaft diameter;
   the shaft defines a disc portion oriented between the first end and the second end;
   the disc portion defines a diameter that is greater than the shaft diameter; and
   the disc is mounted on the disc portion.

3. The sliding disc assembly of claim 1, wherein the second shoulder of the bearing journal abuts the lower disc surface of the disc.

4. The sliding disc assembly of claim 1, wherein the upper disc surface is substantially hemispherical and the lower disc surface is substantially hemispherical, the disc being substantially bowl-shaped.

5. The sliding disc assembly of claim 1, wherein:
   the disc defines a central opening, the shaft extending through the central opening;
   an upper flange extends from the upper disc surface and surrounds the central opening; and
   the upper flange extends into the second spring at a lower spring end of the second spring.

6. The sliding disc assembly of claim 1, wherein the second spring define an upper spring end, a lower spring end, and a spring diameter, the lower spring end oriented proximate to the disc, the spring diameter tapering from the upper spring end to the lower spring end.

7. The sliding disc assembly of claim 1, wherein:
   the disc defines a central opening, the shaft extending through the central opening;
   a lower flange extends from the lower disc surface and surrounds the central opening; and
   the first spring abuts the lower flange at an upper spring end of the first spring.

8. The sliding disc assembly of claim 7, wherein:
   the shaft defines a disc portion and the bearing journal;
   the disc portion extends through the central opening; and
   the second shoulder abut the lower flange.

9. A dual spring valve comprising:
   a valve body, the valve body defining an inlet end, an outlet end, and a cavity extending from the inlet end to the outlet end;
   a seat body positioned within the cavity and defining a seating surface; and a sliding disc assembly positioned within the cavity, the sliding disc assembly comprising a disc, a first spring, and a second spring, the disc defining a base surface, the sliding disc assembly movable between a first position, wherein the base surface is spaced from the seating surface, and a second position, wherein the base surface seats with seating surface, the second spring biasing the sliding disc assembly towards the first position, and the first spring biasing the sliding disc assembly towards the second position;

wherein:
the dual spring valve is in an open configuration when the sliding disc assembly is in the first position and a closed configuration when the sliding disc assembly is in the second position;
the first spring defines a spring force that is less than a spring force of the second spring; and
the dual spring valve is naturally oriented in the open configuration.

10. The dual spring valve of claim 9, wherein:
the sliding disc assembly further comprises a shaft defining a first end and a second end;
the disc defines a central opening and the shaft extends through the central opening to mount the disc on the shaft;
the first spring is mounted on the shaft between the disc and the first end of the shaft; and
the second spring is mounted on the shaft between the disc and the second end of the shaft.

11. The dual spring valve of claim 9, further comprising a seat vane assembly, the seat vane assembly comprising one or more seat vanes, each of the seat vanes defining a proximal end and a distal end, each of the seat vanes extending substantially radially inward from the seat body at the proximal end.

12. The dual spring valve of claim 11, wherein the seat vane assembly further comprises a seat guide ring, each of the seat vanes coupled to the seat guide ring at the corresponding distal end, the seat guide ring defining a seat guide bore, the sliding disc assembly configured to slidably engage the seat guide bore.

13. The dual spring valve of claim 9, further comprising a body vane assembly within the cavity, the body vane assembly comprising at least one body vane and a body guide ring, each of the body vanes extending from the valve body to the body guide ring, the body guide ring defining a body guide bore, the sliding disc assembly configured to slidably engage the body guide bore.

14. The dual spring valve of claim 13, further comprising a bushing configured to engage the body guide bore, the bushing defining a bushing bore, the sliding disc assembly configured to slidably engage the bushing bore, the first spring extending between the disc and the bushing.

15. The dual spring valve of claim 9, wherein at least one flow opening is formed through the disc.

16. A method of operating a dual spring valve comprising:
providing the dual spring valve comprising a valve body defining a cavity and a sliding disc assembly received in the cavity, the sliding disc assembly comprising a first spring, a second spring, and a disc, wherein a spring force of the second spring is greater than a spring force of the first spring;
biasing the sliding disc assembly to a first position within the cavity with the second spring, wherein the disc is spaced from a seat body of the dual spring valve in the first position;
applying a fluid force to the disc with fluid in the cavity; and
biasing the sliding disc assembly to a second position within the cavity with the first spring and the fluid force, wherein a base surface of the disc engages a seating surface of the seat body in the second position;

wherein:
the disc is substantially bowl-shaped and defines a substantially hemispherical upper disc surface and a substantially hemispherical lower disc surface;
the base surface is substantially annular and extends between the upper disc surface and the lower disc surface; and
the fluid force is applied to the lower disc surface.

17. The method of claim 16, wherein:
the valve body defines an inlet end and an outlet end;
the sliding disc assembly further comprises a shaft slidably mounted within the cavity;
biasing the sliding disc assembly to a first position comprising sliding the shaft within the cavity towards the inlet end; and
biasing the sliding disc assembly to a second position by sliding the shaft within the cavity towards the outlet end.

18. A sliding disc assembly for a dual spring valve comprising:
a shaft defining a first end and a second end;
a disc mounted on the shaft between the first end and the second end, the disc defining an upper disc surface, a lower disc surface, and an annular base surface;
a first spring mounted on the shaft between the lower disc surface and the first end of the shaft; and
a second spring mounted on the shaft between the upper disc surface and the second end of the shaft, wherein the first spring defines a spring force that is different from a spring force of the second spring;
wherein the upper disc surface is substantially hemispherical and the lower disc surface is substantially hemispherical, the disc being substantially bowl-shaped.

19. A sliding disc assembly for a dual spring valve comprising:
a shaft defining a first end and a second end;
a disc mounted on the shaft between the first end and the second end, the disc defining an upper disc surface, a lower disc surface, and an annular base surface;
a first spring mounted on the shaft between the lower disc surface and the first end of the shaft; and
a second spring mounted on the shaft between the upper disc surface and the second end of the shaft, wherein the first spring defines a spring force that is different from a spring force of the second spring
wherein:
the disc defines a central opening, the shaft extending through the central opening;
an upper flange extends from the upper disc surface and surrounds the central opening; and
the upper flange extends into the second spring at a lower spring end of the second spring.

20. A sliding disc assembly for a dual spring valve comprising:
a shaft defining a first end and a second end;
a disc mounted on the shaft between the first end and the second end, the disc defining an upper disc surface, a lower disc surface, and an annular base surface;
a first spring mounted on the shaft between the lower disc surface and the first end of the shaft; and a second spring mounted on the shaft between the upper disc surface and the second end of the shaft, wherein the first spring defines a spring force that is different from a spring force of the second spring;

wherein:
the disc defines a central opening, the shaft extending through the central opening;
a lower flange extends from the lower disc surface and surrounds the central opening; and
the first spring abuts the lower flange at an upper spring end of the first spring.

21. The sliding disc assembly of claim 20, wherein:
the shaft defines a disc portion and a bearing journal;
the disc portion extends through the central opening;
the bearing journal defines a first shoulder and an opposite second shoulder; and
the second shoulder abut the lower flange.

22. A dual spring valve comprising:
a valve body, the valve body defining an inlet end, an outlet end, and a cavity extending from the inlet end to the outlet end;
a seat body positioned within the cavity and defining a seating surface; and
a sliding disc assembly positioned within the cavity, the sliding disc assembly comprising a disc, a first spring, and a second spring, the disc defining a base surface, the sliding disc assembly movable between a first position, wherein the base surface is spaced from the seating surface, and a second position, wherein the base surface seats with seating surface, the second spring biasing the sliding disc assembly towards the first position, and the first spring biasing the sliding disc assembly towards the second position;
wherein:
the dual spring valve is in an open configuration when the sliding disc assembly is in the first position and a closed configuration when the sliding disc assembly is in the second position;
the sliding disc assembly further comprises a shaft defining a first end and a second end;
the disc defines a central opening and the shaft extends through the central opening to mount the disc on the shaft;
the first spring is mounted on the shaft between the disc and the first end of the shaft; and
the second spring is mounted on the shaft between the disc and the second end of the shaft.

23. A dual spring valve comprising:
a valve body, the valve body defining an inlet end, an outlet end, and a cavity extending from the inlet end to the outlet end;
a seat body positioned within the cavity and defining a seating surface;
a sliding disc assembly positioned within the cavity, the sliding disc assembly comprising a disc, a first spring, and a second spring, the disc defining a base surface, the sliding disc assembly movable between a first position, wherein the base surface is spaced from the seating surface, and a second position, wherein the base surface seats with seating surface, the second spring biasing the sliding disc assembly towards the first position, and the first spring biasing the sliding disc assembly towards the second position; and
a seat vane assembly, the seat vane assembly comprising one or more seat vanes, each of the seat vanes defining a proximal end and a distal end, each of the seat vanes extending substantially radially inward from the seat body at the proximal end;
wherein the dual spring valve is in an open configuration when the sliding disc assembly is in the first position and a closed configuration when the sliding disc assembly is in the second position.

24. The dual spring valve of claim 23, wherein the seat vane assembly further comprises a seat guide ring, each of the seat vanes coupled to the seat guide ring at the corresponding distal end, the seat guide ring defining a seat guide bore, the sliding disc assembly configured to slidably engage the seat guide bore.

25. A dual spring valve comprising:
a valve body, the valve body defining an inlet end, an outlet end, and a cavity extending from the inlet end to the outlet end;
a seat body positioned within the cavity and defining a seating surface;
a sliding disc assembly positioned within the cavity, the sliding disc assembly comprising a disc, a first spring, and a second spring, the disc defining a base surface, the sliding disc assembly movable between a first position, wherein the base surface is spaced from the seating surface, and a second position, wherein the base surface seats with seating surface, the second spring biasing the sliding disc assembly towards the first position, and the first spring biasing the sliding disc assembly towards the second position; and
a body vane assembly within the cavity, the body vane assembly comprising at least one body vane and a body guide ring, each of the body vanes extending from the valve body to the body guide ring, the body guide ring defining a body guide bore, the sliding disc assembly configured to slidably engage the body guide bore;
wherein the dual spring valve is in an open configuration when the sliding disc assembly is in the first position and a closed configuration when the sliding disc assembly is in the second position.

26. The dual spring valve of claim 25, further comprising a bushing configured to engage the body guide bore, the bushing defining a bushing bore, the sliding disc assembly configured to slidably engage the bushing bore, the first spring extending between the disc and the bushing.

27. A dual spring valve comprising:
a valve body, the valve body defining an inlet end, an outlet end, and a cavity extending from the inlet end to the outlet end;
a seat body positioned within the cavity and defining a seating surface; and
a sliding disc assembly positioned within the cavity, the sliding disc assembly comprising a disc, a first spring, and a second spring, the disc defining a base surface, the sliding disc assembly movable between a first position, wherein the base surface is spaced from the seating surface, and a second position, wherein the base surface seats with seating surface, the second spring biasing the sliding disc assembly towards the first position, and the first spring biasing the sliding disc assembly towards the second position;
wherein the dual spring valve is in an open configuration when the sliding disc assembly is in the first position and a closed configuration when the sliding disc assembly is in the second position, and wherein at least one flow opening is formed through the disc.

* * * * *